United States Patent
DuBose

Patent Number: 6,013,385
Date of Patent: Jan. 11, 2000

[54] FUEL CELL GAS MANAGEMENT SYSTEM

[75] Inventor: Ronald Arthur DuBose, Marietta, Ga.

[73] Assignee: Emprise Corporation, Marietta, Ga.

[21] Appl. No.: 08/900,822

[22] Filed: Jul. 25, 1997

[51] Int. Cl.[7] .................................................. H01M 8/04
[52] U.S. Cl. ................... 429/17; 429/24; 429/26
[58] Field of Search ................... 429/17, 22, 24, 429/25, 26

[56] References Cited

U.S. PATENT DOCUMENTS

| | | | |
|---|---|---|---|
| 3,455,743 | 7/1969 | Huebscher et al. | 429/26 X |
| 3,516,867 | 6/1970 | Dankese | 136/86 |
| 3,666,007 | 5/1972 | Yoshino et al. | 165/166 |
| 3,669,751 | 6/1972 | Richman | 136/86 |
| 3,865,924 | 2/1975 | Gidaspow et al. | 429/17 X |
| 3,945,844 | 3/1976 | Nickols | 429/26 |
| 4,037,024 | 7/1977 | Landau | 429/26 X |
| 4,075,396 | 2/1978 | Grehier | 429/25 X |
| 4,206,722 | 6/1980 | Nolley, Jr. | 122/1 A |
| 4,824,740 | 4/1989 | Abrams et al. | 429/26 X |
| 5,542,259 | 8/1996 | Worek et al. | 62/94 |
| 5,542,968 | 8/1996 | Belding et al. | 96/125 |

*Primary Examiner*—Stephen Kalafut
*Attorney, Agent, or Firm*—Deveau & Marquis

[57] ABSTRACT

A fuel cell gas management system including a cathode humidification system for transferring latent and sensible heat from an exhaust stream to the cathode inlet stream of the fuel cell; an anode humidity retention system for maintaining the total enthalpy of the anode stream exiting the fuel cell equal to the total enthalpy of the anode inlet stream; and a cooling water management system having segregated deionized water and cooling water loops interconnected by means of a brazed plate heat exchanger.

25 Claims, 5 Drawing Sheets

FUEL CELL GAS MANAGEMENT SYSTEM

This invention was made with government support under DOE Contract No. DE-AC02-94CE50390 awarded by The United States Department of Energy. The government has certain rights in the invention.

BACKGROUND OF THE INVENTION

1. Field of the Invention

The present invention relates generally to a method and apparatus for the management and control of various flow streams related to the operation of a fuel cell. The present invention relates more specifically to a fuel cell gas management system which includes subsystems for conditioning the temperature and humidity of the air or other oxidant supplied to a fuel cell's cathode, for anode fuel humidity retention, and for cooling water circulation.

2. Description of Related Art

Fuel cells generate electrical energy by chemical reaction without altering the electrodes or electrolyte of the cell itself. The utility of fuel cells has been known since at least as early as 1939, when Grove demonstrated that electrolysis of water could be reversed using platinum electrodes. Further developments in the fuel cell field have included the development of proton exchange membrane (PEM) fuel cells, phosphoric acid fuel cells, alkaline fuel cells, and fuel cells incorporating reformer technology to crack hydrocarbons such as gasoline to obtain hydrogen to feed the fuel cell.

Fuel cells have found application in a number of fields. One area of particular interest has been the application of fuel cell technology in electrically-powered automobiles. In automotive applications, weight and space are at a premium, and therefore, the fuel cell and its supporting systems must be as small and lightweight as possible. Moreover, because automotive applications subject equipment to a wide and rapidly fluctuating range of operating conditions such as temperature, humidity, etc., equipment utilized in such applications must be capable of withstanding and operating under a variety of conditions. Equipment utilized in automotive applications must also be sufficiently rugged to withstand the vibrations and stresses induced by over-the-road use.

Fuel cells generally require two independent gas flow circuits for delivering reactant gases to the anode and the cathode of the fuel cell. In PEM fuel cells, these gas flow circuits comprise an anode circuit for feeding the fuel, generally hydrogen, to the fuel cell; and a cathode circuit for feeding the oxidant, typically air from the ambient, to the fuel cell. In order to maintain proper operating conditions for the fuel cell, the temperatures and humidities of the anode and cathode circuits must be precisely controlled to avoid drying out the electrolyte or otherwise damaging the fuel cell, and thereby stopping the flow of electricity from the fuel cell.

Several systems for conditioning the gas flow circuits of a fuel cell have been proposed. For example, U.S. Pat. No. 3,516,867 to Dankese discloses a fuel cell system including a dehumidifier and a humidifier for conditioning the fuel cell's gas streams. The humidification portion of this system achieves moisture transfer through a partition. This type of humidification system has been found inefficient for automotive applications, mainly because of the large surface areas required to transfer the necessary quantity of moisture to the gas streams, and because of the undesirable weight of such large-scale systems. In addition, large quantities of heat energy are consumed in vaporizing moisture in this type of humidification system, which energy consumption reduces system efficiency.

U.S. Pat. No. 3,669,751 to Richman discloses a fuel cell, hydrogen generator, and heat exchanger system, wherein the reactant air to be supplied to the fuel cell is brought into evaporative contact with the wet electrolyte to humidify the reactant air. The system of Richman suffers similar disadvantages to that of Dankese; namely, the requirement of large surface areas for effecting moisture transfer and the resulting weight of system components, as well as the consumption of considerable energy in vaporizing the moisture.

In addition to cathode humidification, existing fuel cell technology requires the humidification of the hydrogen fuel stream input to the fuel cell's anode, in order to prevent drying out the electrolyte within the fuel cell. This requirement of anode humidification adds additional components to the fuel cell's gas management system, resulting in undesirable increased weight and expense. Moreover, known humidification systems such as membrane humidifiers or systems utilizing airflow through beds of wetted spheres consume considerable energy in vaporizing water to provide the required humidification. Therefore, it has been found that known methods of anode humidification are unsuited to automotive applications.

Thus it can be seen that a need yet exists for a lightweight, efficient means of conditioning the oxidant flow to the cathode inlet of a fuel cell.

A need further exists for a method and apparatus for conditioning the anode inlet to a fuel cell, which minimizes the weight and expense of associated components.

It is to the provision of a method and apparatus of fuel cell gas management meeting these and other needs that the present invention is primarily directed.

BRIEF SUMMARY OF THE INVENTION

Briefly described, in a preferred form, the present invention comprises a fuel cell gas management system comprising a cathode humidification system, an anode humidity retention system, and a cooling water processing system. The present invention provides greatly reduced weight and complexity over known fuel cell gas management systems and techniques, and is well suited to automotive applications.

The cathode humidification system of the present invention preferably comprises a compressing means for pressurizing air to be input to the fuel cell's cathode for use as the fuel cell's oxidant, and a sensible and latent heat transfer device such as an enthalpy wheel, for conditioning the pressurized oxidant. The cathode humidification system can further comprise an adiabatic quench means for controlling the dry bulb temperature of the air, by vaporization of quench water into the air stream, prior to its introduction to the enthalpy wheel. The enthalpy wheel operates by removing both sensible and latent heat from the fuel cell cathode exhaust stream to heat and humidify the cathode inlet stream. Because the water vapor collected from the cathode exhaust never condenses in the enthalpy wheel, but rather, is trapped as a vapor within the enthalpy wheel, it is unnecessary to provide energy (in the form of heat of vaporization) in transferring moisture removed from the cathode exhaust to the cathode inlet by the enthalpy wheel.

The adiabatic quench means of the present invention preferably comprises means for collecting liquid from the cathode exhaust, transfer means for transporting the collected liquid to the point of introduction to the cathode inlet, and a means of introduction of the collected liquid into the oxidant's stream. In preferred form, the means of introduction comprises an ultrasonic nozzle for dispersing the liquid, in a mist of fine droplets, into the oxidant stream.

The quench rate at the cathode inlet controls the dry bulb temperature of the inlet air stream, while the speed of the enthalpy wheel controls the wet bulb temperature, and thus the relative humidity of the cathode inlet. By varying the speed of the rotation of the enthalpy wheel, the amount of moisture transferred to the cathode inlet can be varied. Temperature, pressure, and relative humidity sensors are preferably provided to monitor the cathode inlet conditions and provide feedback control, through a computerized control system, for the adiabatic quench rate and the rotational speed of the enthalpy wheel.

As a further refinement to the invention, the size of the openings in the enthalpy wheel can be chosen to selectively filter out nitrogen and other components of the cathode inlet airstream, thereby increasing the partial pressure of oxygen in the inlet airstream to increase fuel cell efficiency. Alternatively, two or more porous wheels can be provided in series, having opening sizes to selectively filter out various components from the cathode inlet and/or exhaust streams.

The anode humidity retention system of the present invention preferably comprises one or more eductors or other means for recirculating the anode exhaust stream to the anode inlet. By mixing the anode exhaust with supply hydrogen from storage tanks, the cool, dry hydrogen from the tanks is humidified by an approximately equal amount of moist exhaust hydrogen from the fuel cell. The fuel cell operating conditions are controlled to provide an excess of hydrogen (preferably at a stoichiometric ratio of approximately 2.0) to the anode inlet, and to control the temperature of the anode inlet hydrogen stream. In this mariner, the total enthalpy of the anode exhaust is controlled to be approximately equal to the inlet total enthalpy, thereby, in effect, utilizing surplus hydrogen to transport anode humidity through the fuel cell, back to the anode inlet stream and preventing moisture from condensing out of the anode stream in the fuel cell. In this manner, the need for an anode humidifier, and its associated equipment, is eliminated, thereby reducing weight, expense and occupied space, and further eliminating the need for disposal of excess water generated in the fuel cell. The anode gas management subsystem also functions to maintain the anode pressure at or near that of the cathode in order to minimize the possibility of blowing out the cell's membranes.

The fuel cell, sometimes also referred to as a "stack," is cooled by circulating deionized water through the stack. Deionized water is an aggressive corrosive agent and, therefore, stainless steel piping and equipment must be utilized in handling this deionized water. Because stainless steel is a poor thermal conductor, and is heavy and expensive, use of a stainless radiator to effect water-to-air heat transfer has been found to be undesirable, especially in automotive applications. Therefore, the present invention utilizes a stainless brazed plate heat exchanger to effect water-to-water transfer of stack heat, from a closed deionized water circuit to an ordinary ethylene glycol and water cooling stream. Then, a standard commercial automotive radiator system can be utilized for water-to-air heat transfer from the glycol/water stream. In this manner, heat from the deionized water is transferred by water-to-water convection through the brazed plate heat exchanger's thin stainless plates, at a much higher heat transfer rate than could be obtained through stainless steel-to-air heat exchange by a stainless radiator. This aspect of the present invention enables the use of a more efficient, lighter, cheaper, aluminum water-to-air automotive radiator, and minimizes the quantity of deionized water required. The use of a more efficient aluminum radiator also reduces the required surface area for effecting heat transfer, thereby minimizing aerodynamic drag associated with the radiator.

Accordingly, it is an object of the present invention to provide a gas management system for conditioning the reactant streams of a fuel cell, which is compact, lightweight and inexpensive.

Another object of the present invention is to provide a fuel cell gas management system which enables cathode air humidification, anode hydrogen humidity retention, and cooling water processing for a fuel cell.

A further object of the present invention is to provide a method and apparatus for transferring sensible and latent heat from the fuel cell's cathode exhaust stream to the cathode inlet stream.

A further object of the present invention is to provide a method and apparatus for retaining humidity within the hydrogen fuel stream supplied to the anode inlet of a fuel cell.

Yet another object of the present invention is to provide a method and apparatus for processing deionized cooling water for a fuel cell, which method and apparatus minimizes the quantity of deionized water necessary, and minimizes the overall weight, surface area and aerodynamic drag of the cooling system.

These and other objects, features, and advantages of the present invention will become more apparent upon reading the following specification in conjunction with the accompanying drawing figures.

DETAILED DESCRIPTION OF A PREFERRED EMBODIMENT

Figure 1:
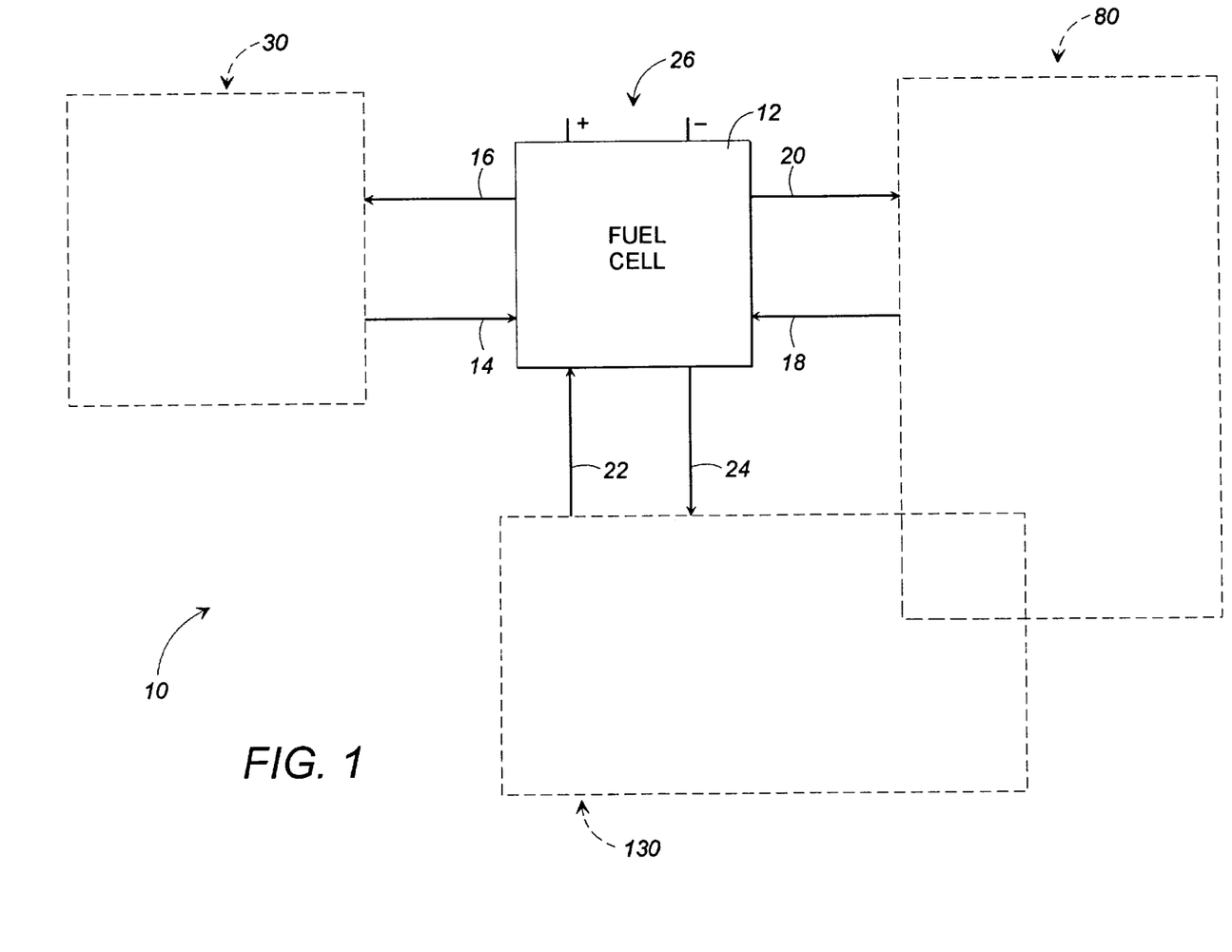
FIG. 1 is a schematic diagram showing the fuel cell gas management system of the present invention, according to a preferred form.

Referring now in detail to the drawing figures wherein like reference numerals represent like parts throughout, FIG. 1 shows the fuel cell gas management system 10 of the present invention, according to a preferred form. The gas management system 10 generally comprises a cathode humidification system 30, an anode humidity retention system 80, and a cooling water processing system 130, all connected to a fuel cell 12. The fuel cell 12 generally comprises a cathode inlet 14, a cathode exhaust 16, an anode inlet 18, an anode exhaust 20, a cooling water inlet 22 and a cooling water discharge 24. Electricity generated by the fuel cell 12 is conducted to a load (unshown) by conductors 26. The fuel cell 12 can be used to supply electrical power for a variety of applications. For example, the fuel cell 12 can be used to recharge the batteries of an electric automobile, or can be used as a power source for commercial or household electrical service.

The fuel cell 12 operates according to known methods, and may be any of a number of known fuel cell varieties. In the described embodiment, the fuel cell will be described as a proton exchange membrane (PEM) fuel cell. However, the present invention is not so limited, and may be applied to the reactant streams of other types of fuel cells as well. In a typical proton exchange membrane fuel cell, hydrogen is supplied to the fuel cell's anode inlet 18, for use as the fuel, and air is supplied to the cathode inlet 14 of the fuel cell 12 for use as the fuel cell's oxidant. Within the fuel cell or stack the oxidant and the fuel react to generate water and electrical power. An electrolyte solution, maintained between catalyst membranes within the fuel cell conducts a flow of electrons through the fuel cell to the conductors 26. The electrolyte solution must be maintained in a moist condition in order to maintain conductivity. Fuel and oxidant are passed through alternate layers in the stack. The layers are separated by catalyst membranes, which promote the reaction between the fuel and the oxidant.

Cathode Humidification System

Because the fuel cell 12 operates best at elevated temperatures, it has been found desirable to heat and humidify the oxidant air supplied to the cathode inlet 14 in order to prevent the cathode air stream from drying out the electrolyte in the fuel cell. The cathode humidification system 30 of the present invention is shown in greater detail by FIGS. 2 and 4.

Figure 2:
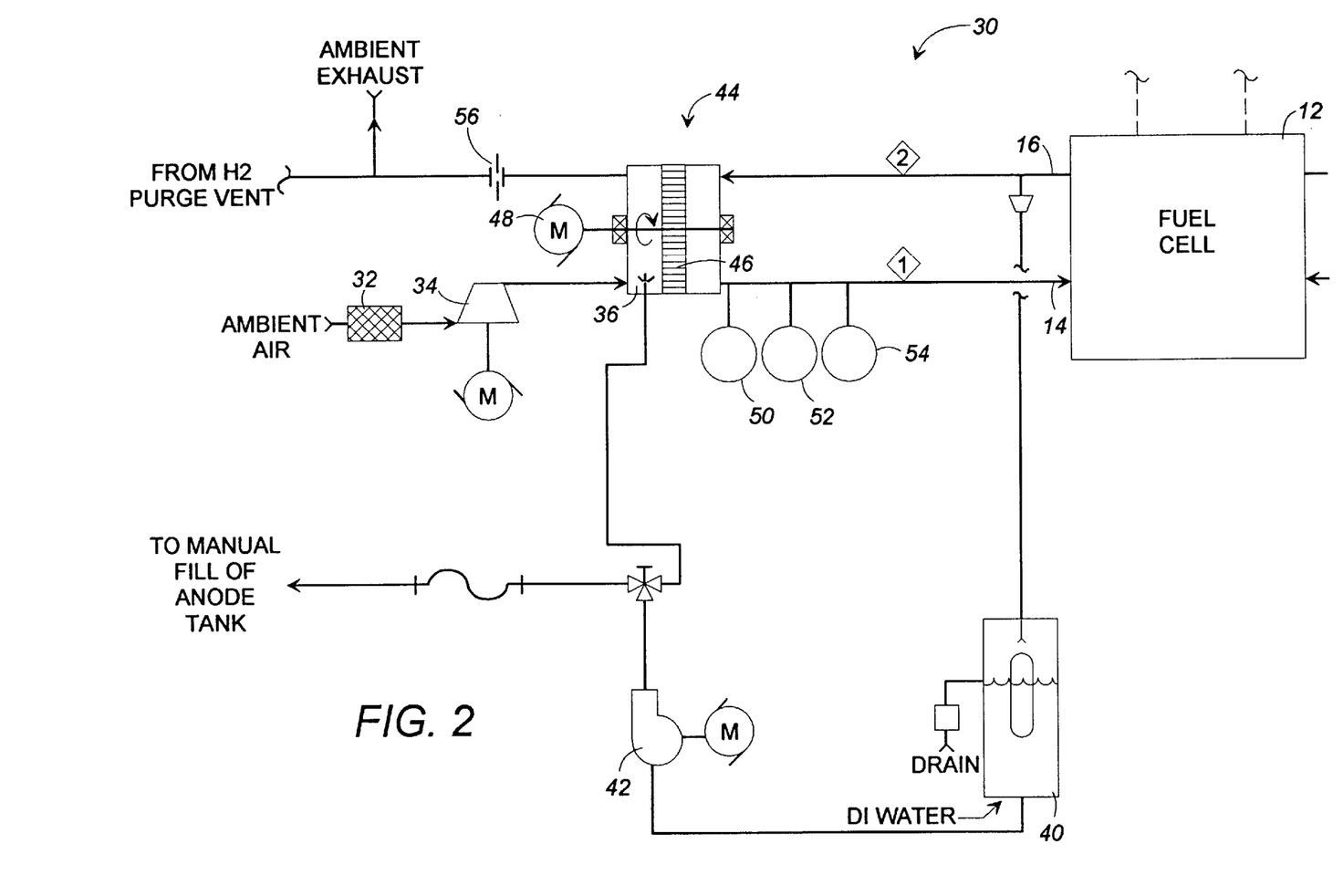
FIG. 2 is a schematic diagram showing a preferred form of the cathode humidification system of the present invention in greater detail.
Figure 4:
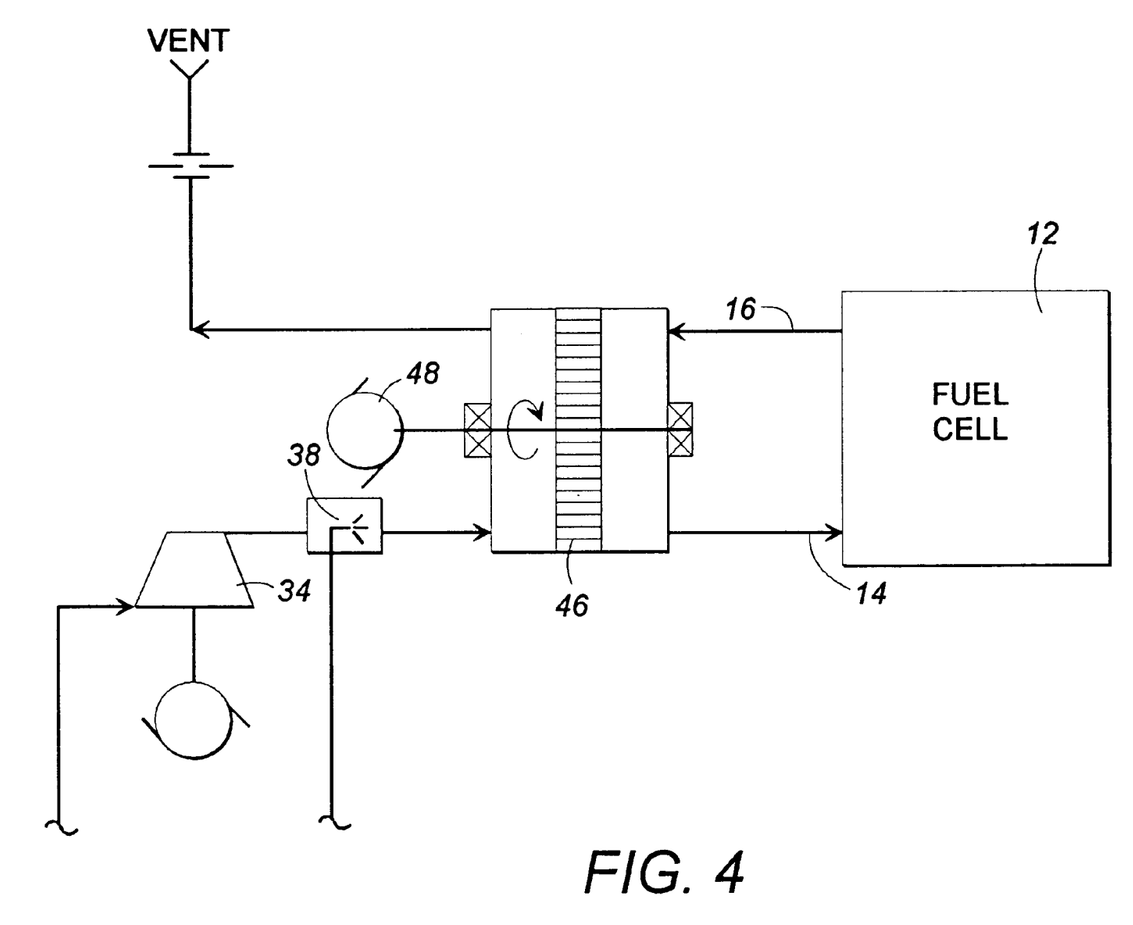
FIG. 4 is a schematic diagram showing the cathode humidification system of FIG. 1 in greater detail.

Ambient air is drawn through a filtering means 32, such as a commercially available automotive air filter, and into a pressurization means 34. The pressurization means 34 is preferably a motor driven compressor, and preferably compresses the inlet air to approximately 2 atmospheres. An electrically-powered, twin-screw compressor, such as the motorcycle supercharger manufactured by Opcon Autorotor AB of Nacka, Sweden has been found to provide acceptable performance as the pressurization means 34.

The airstream exiting the pressurization means 34 is typically at an elevated dry bulb temperature. The preferred operating conditions of the fuel cell 12 require the inlet air supplied to the cathode inlet 14 to be at 70° C. dewpoint and 75° C. dry bulb. Thus, it is necessary to introduce humidity to the inlet air stream and to reduce its dry bulb temperature. The present invention reduces the dry bulb temperature and, to a minor extent begins humidification of the cathode inlet air stream, through the use of a carefully controlled adiabatic quench means 36. The adiabatic quench means 36 preferably comprises an ultrasonic nozzle 38, which supplies a fine mist of quench water to the compressed air from a cathode water reservoir 40 by means of a quench water metering pump 42. The heat of vaporization consumed in evaporating the quench water reduces the dry bulb temperature of the air. By controlling the metering pump 42, the rate of quench water supplied to the air stream, and thus, the amount of dry bulb cooling is controlled. Liquid water collected from the cathode exhaust 16 can be collected in the reservoir 40 for use in the quench stage.

After the quench phase, the cooled compressed air is introduced to an enthalpy transfer means 44 for transferring sensible and latent heat from the cathode exhaust stream to the cathode inlet stream. In preferred form, the enthalpy transfer means 44 comprises a rotationally driven enthalpy wheel 46 comprising a porous material, for example, a structure of acrylic fiber or other material which is resistant to attack by deionized water, coated with a water selective molecular sieve desiccant or zeolite. The mass of the wheel transports sensible heat, while the desiccant traps and transfers water vapor molecules and, thereby, latent heat. Synthetic fiber-based energy conservation wheels manufactured by LaRoche Air Systems, Inc. have been found to provide acceptable heat transfer performance, and to resist attack by deionized water.

A variable speed electric motor 48 is preferably provided for driving the enthalpy wheel 46. Saturated exhaust air from the cathode discharge 16 is routed through a first side of the enthalpy wheel 46, where sensible and latent heat are collected by the enthalpy wheel as the exhaust air passes therethrough. As the enthalpy wheel rotates, this sensible and latent heat is released into the supply air stream being supplied to the cathode inlet 14. By controlling the rate of rotation of the enthalpy wheel 46, the rate of heat transfer, and thus the relative humidity (and wet bulb temperature) is controlled.

Sensors such as a relative humidity sensor 50, a temperature sensor 52 and a pressure sensor 54 are preferably provided for monitoring the conditions of the air discharged from the enthalpy transfer means 44 into the fuel cell cathode inlet 14. By means of an unshown computer feedback control system, the dry bulb temperature and relative humidity of the cathode inlet air stream can be controlled by selectively adjusting the quench rate and/or the speed of rotation of the enthalpy wheel 46.

A throttling valve or orifice fitting 56 is preferably provided in the cathode exhaust conduit after the enthalpy transfer means 44, for maintaining the operating pressure in the cathode air stream. Any liquid water condensed in the stack is collected and drained to the cathode water reservoir 40 for use by the quench pump, and for periodic manual or automatic anode replenishment.

Although an enthalpy wheel is the preferred enthalpy transfer means, alternate enthalpy transfer means can be utilized. For example, two or more beds or towers of zeolites can be operated, by means of continuous sequential valving, to alternate between a charging mode whereby fuel cell exhaust air heats and humidifies the zeolite, and a discharging mode whereby the heat and humidity trapped in the zeolite beds or towers is released into the cathode supply air. The use of an enthalpy wheel, however, has been found to provide very good performance and to minimize space and weight requirements.

The pore sizes in the zeolite of the enthalpy wheel 46 can be chosen to selectively entrap or filter one or more components from the inlet or exhaust air streams. Alternatively, additional molecular sieve wheels can be installed in the air stream(s), for selective filtering. In this manner, for example, by selectively filtering nitrogen from the inlet air stream, the partial pressure of oxygen in the inlet air stream can be increased, thereby providing more efficient fuel cell operation.

Figure 5:
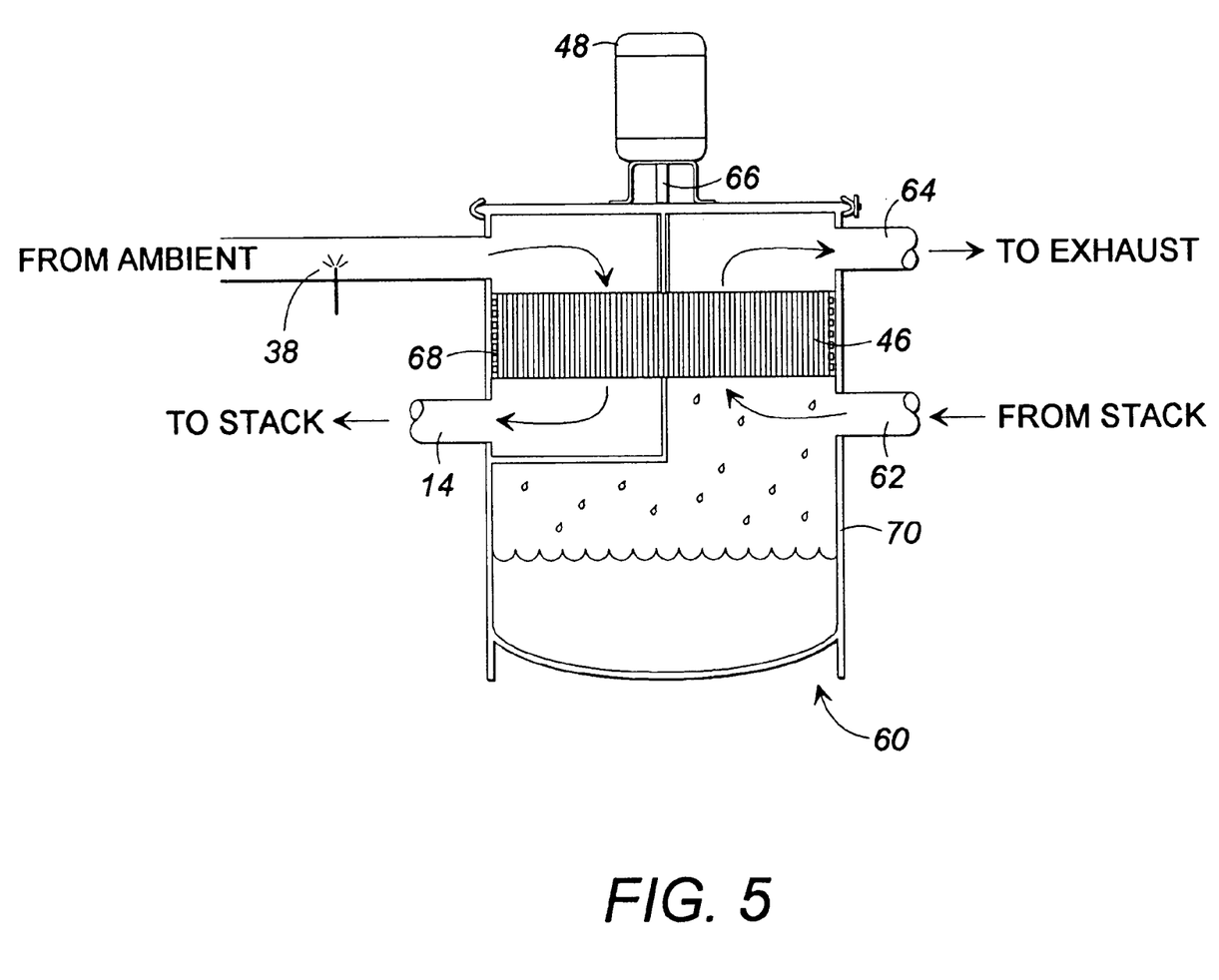
FIG. 5 shows a preferred form of the cathode humidifier portion of the cathode humidification system of FIG. 2.

The cathode humidification system components, including the enthalpy wheel 46, the cathode water reservoir 40, the metering pump 42 and the ultrasonic nozzle 38 can be physically combined, according to a preferred form of the present invention, to provide a compact cathode humidifier 60, as shown in greater detail by FIG. 5. As depicted, the enthalpy wheel 46 is horizontally mounted directly above the water reservoir 40. The fuel cell exhaust enters the cathode humidifier 60 at an exhaust inlet manifold 62, and exits the cathode humidifier at an exhaust outlet manifold 64. The saturated exhaust air passes upward through the enthalpy wheel 46 and condensed liquid is collected below the enthalpy wheel 46 for use by the quench pump. A labyrinth seal 68 can be provided between the enthalpy wheel and the housing 70 of the humidifier 60. The gear motor 48 is mounted to the top of the cathode humidifier and connects to the enthalpy wheel 46 through a drive shaft 66.

Anode Humidity Retention System

Figure 3:
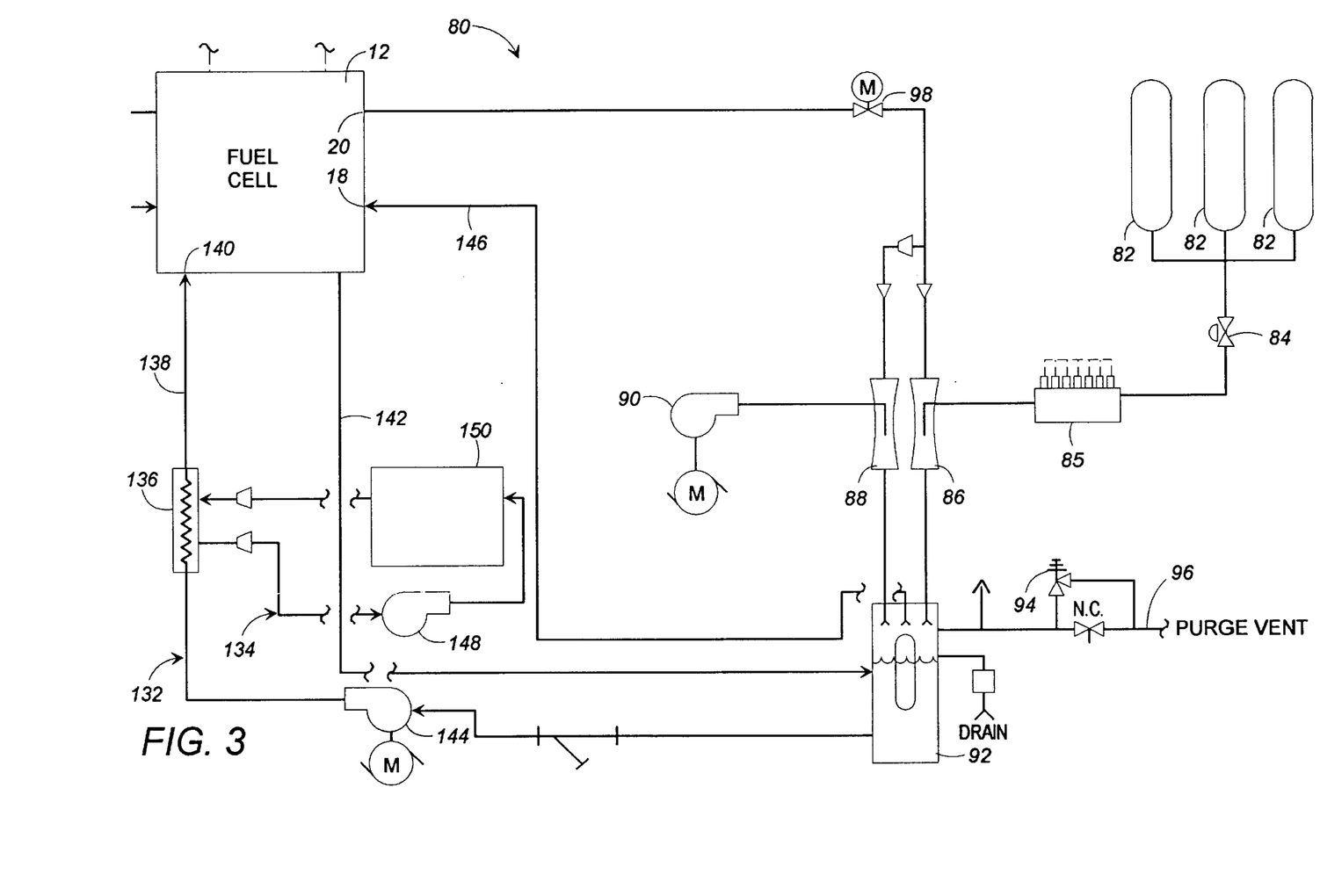
FIG. 3 is a schematic diagram showing a preferred form of the anode humidity retention system and the cooling water processing system of the present invention in greater detail.

FIG. 3 shows schematically the anode humidity retention system 80 of the present invention, according to a preferred form. Hydrogen gas used as the fuel in a PEM fuel cell is preferably stored in one or more high pressure storage means such as tanks 82. A regulating means such as a high pressure solenoid operated reducing valve 84, reduces the pressure of the supplied hydrogen from tanks 82 to a usable level. A computer-controlled digital regulator valve 85 is preferably provided for regulating the hydrogen inlet flow to the fuel cell from the tanks 84.

In order to efficiently utilize the hydrogen supplied to the fuel cell 12, it has been found desirable to recirculate the excess hydrogen exhausted from the anode exhaust 20 of the fuel cell 12 back to the fuel cell's anode inlet. However, because of hydrogen's small molecular size, it is difficult to pump and contain hydrogen by standard compressors or by pumps having rotating shafts and mechanical seals. Accordingly, in preferred form, the present invention utilizes one or more eductors to recirculate hydrogen through the anode loop. These eductors incorporate a converging-diverging nozzle and an injection port for injecting a high velocity flow adjacent the nozzle's point of contraction, for inducing a flow in the recirculated hydrogen. A first or "running" eductor 86, powered by the injection of high pressure hydrogen from the storage tanks, serves to recirculate the hydrogen when the fuel cell is operating in standard operating mode. The use of eductors, rather than pumps, eliminates the presence of moving parts in the hydrogen loop, which could create sparks and result in an explosion.

In order to provide sufficient motive force to recirculate the hydrogen, however, it is necessary that the running eductor 86 receive a sufficient flow of high pressure hydrogen from the storage tanks. At normal running conditions, the fuel cell consumes an amount of hydrogen sufficient to allow the running eductor 86 to circulate hydrogen fuel through the anode loop. However, during start up, little or no hydrogen is consumed by the fuel cell, and the running eductor 86 provides insufficient recirculation. Therefore, the anode humidity retention system of the present invention preferably further comprises a second or "start-up" eductor 38. The start-up eductor 88 is powered by injection of water or other driving fluid, which is preferably supplied by an electric motor driven start-up pump 90, which provides the motive flow and begins circulating and humidifying the anode loop. As the fuel cell begins consumption of hydrogen fuel, high pressure hydrogen from the tanks 82 begins to be drawn through the running eductor 86. Generally, a high-velocity stream of second reactant, here described as the velocity of the high-pressure hydrogen from the tanks 82, travels at a velocity typically in excess of mach 1. Therefore, as defined herein a velocity in this range defines that speed of the high-velocity stream of second reactant. Both eductors 86, 88 then operate in parallel, until operating conditions are achieved. At such time, the start-up eductor 88 may be shut down, and the running eductor 86 then takes over the recirculation of the anode loop. The recirculation of hydrogen in the anode loop during start-up is desirable, as venting the hydrogen during start-up can result in undesirable accumulation of explosive hydrogen.

Recirculated hydrogen exhausted from the stack mixes with the fresh, high-pressure hydrogen from the tanks 82 in the running eductor 86, and is discharged to the anode reservoir 92, where any liquid water entrained in the hydrogen flow is collected. Also, the high vapor pressure of the stack cooling water within the anode reservoir 92 serves to buffer the humidity of the hydrogen stream. The anode reservoir 92 is preferably fitted with a relief valve 94 to protect against excessive pressurization, and with a timed computer control purge vent 96 which periodically purges the anode circuit to eliminate any accumulation of inert gas or air in the anode which could lead to an explosive condition.

Due to the constant recycling of the hydrogen loop, air which may leak through the fuel cell from the cathode side may accumulate and develop an explosive atmosphere in the anode hydrogen loop. Therefore, it is necessary to periodically vent a portion of the hydrogen from the anode loop through the purge vent 96 to the atmosphere. Purge vent 96 can be computer controlled to allow venting only at safe conditions, such as when a fuel cell powered vehicle is operating at a sufficient rate of speed to safely disperse the vented hydrogen.

Hydrogen fuel flows from the anode reservoir 92 to the fuel cell's anode inlet 18. Hydrogen which is not consumed in the fuel cell 12 is then exhausted through the anode discharge 20, and is recirculated through the eductors 86, 88, as described above. The stoichiometric ratio of hydrogen fuel supplied to the anode of the fuel cell 12 is controlled by a damper 98 in the anode discharge conduit 20. Under standard running conditions, fresh hydrogen from the tanks 82 is introduced through the eductors in an approximately equal ratio to the recirculated hydrogen from the anode discharge 20.

It has been discovered that the necessity for anode humidification (and the resulting necessity for humidification equipment) can be eliminated by adjusting the inlet hydrogen temperature and stoichiometric ratio to maintain the total enthalpy of the exhaust stream of hydrogen from the fuel cell equal to the total enthalpy of the inlet stream of hydrogen to the fuel cell. For example, it has been found that under the following anode fuel conditions, the enthalpy of the exhaust hydrogen is equal to the enthalpy of the inlet hydrogen and, therefore, the recirculated hydrogen carries enough sensible and latent heat to mix with the fresh hydrogen from the tanks 82 and maintain the desired anode inlet conditions:

| Recirculated Anode Exhaust | Fresh $H_2$ From Tanks | Mixture to Anode |
| --- | --- | --- |
| 0.08 lb/min | 0.08 lb/min | 0.16 lb/min |
| 83.4° C. db | 25° C. db | 70° C. db |
| 100% RH | 0% RH | 100% RH |
| (113 gr/min. $H_2O$) | (0 gr/min. $H_2O$) | (113 gr/min. $H_2O$) |
| Q = +2.6 kW | Q = −2.6 kW | Q = 0.0 |

At these conditions, with a jacket temperature of 83.4° C., and a stoichiometric ratio of 2.0 Stoich (i.e., supply of two times amount of $H_2$ required by fuel cell), the recirculated exhaust hydrogen fuel from the fuel cell's exhaust will possess a total enthalpy approximately equal to the desired total enthalpy of the inlet mixture of fresh and recirculated hydrogen to the fuel cell.

It will be understood that the above operating parameters are for example only, and that any number of combinations of operating conditions will enable the exploitation of the surplus anode exhaust energy, limited only by the pumping capacity of the eductors and the permissible operating temperature range of the fuel cell 12. By properly adjusting the temperature and stoichiometric ratio of the hydrogen stream to the anode inlet 18, moisture is retained in the hydrogen stream rather than condensing out in the fuel cell. This eliminates the need for adding moisture to the anode inlet stream, as well as eliminating the need for handling waste water condensed in the fuel cell 12.

Because the anode fuel stream is recirculated through the anode reservoir 92, which also serves as the deionized water reservoir for the cooling system (as described in greater detail below), the pressures of the anode fuel stream and the cooling water stream are automatically maintained in equilibrium, thereby preventing potential damage from pressure differentials between these two systems within the fuel cell. The anode hydrogen stream pressure, in turn, is preferably computer controlled by regulating means such as the reducing valve 84 and the digital regulator valve 85, to match the cathode air stream pressure discharged from the compressor 34. Thus, the pressures of all three systems are maintained in equilibrium, thereby reducing the potential for damage to the fuel cell.

Cooling Water Management System

Deionized water is necessary for cooling the fuel cell 12, as standard water would cause the fuel cell to short. Deionized water, however, is highly corrosive and requires stainless steel equipment for its handing. Because stainless steel is a poor conductor of heat, providing a stainless steel radiator for rejecting the heat absorbed by the deionized cooling water from the fuel cell 12 to the ambient air would require a stainless steel radiator having a very large surface area. This large surface area would result in high aerodynamic drag on a fuel cell-powered vehicle, and would result in a very heavy and expensive radiator.

Moreover, because antifreeze agents cannot be added to deionized water, it is desirable to minimize the quantity of deionized water present in the fuel cell cooling system to simplify the required freeze protection.

The cooling water management system 130 of the present invention is shown schematically, in preferred form, by FIG. 3. The cooling water system 130 of the present invention addresses the above-identified problems inherent in stainless steel handling systems for deionized cooling water by providing a "two-stage" cooling water system. This two-stage system preferably comprises two closed loops, namely a deionized water loop 132 and a standard water/glycol loop 134.

A brazed plate heat exchanger 136 provides water-to-water heat transfer between the deionized water loop 132 and the standard water loop 134 without permitting any mixing of the two loops. The brazed plate heat exchanger 136 is preferably provided in the supply line 138 of the deionized water loop 132 between the anode reservoir 92 and the deionized cooling water inlet 140 to the fuel cell 12. Deionized cooling water is discharged from the fuel cell 12 through a deionized cooling water discharge line 142 and returned to the anode reservoir 92. A deionized cooling water pump 144 circulates the deionized cooling water through the deionized water loop 132.

The standard water loop 134 circulates through the brazed plate heat exchanger 136 to absorb heat rejected from the deionized water loop 132. A standard cooling water pump 148 circulates standard cooling water, which can include an antifreeze agent such as ethylene glycol, through the standard water loop 134. A radiator 150 is preferably provided in the standard water loop 134 for rejecting heat to the ambient air.

The brazed plate heat exchanger 136 preferably comprises a stacked array of thin, stainless plates with deionized water and standard cooling water circulating in alternating layers between the thin, stainless plates. In this manner, heat is transferred from the deionized cooling water to the standard cooling water by forced water-to-metal-to-water convection and conduction through the thin stainless plates, thereby resulting in a much greater rate of heat transfer than could be obtained through the use of a stainless steel-to-air fin type radiator.

Once the heat has been transferred to the standard cooling water/glycol mix in the standard cooling water loop 134, non-stainless piping and equipment can be utilized for handling the cooling water and effecting water-to-air heat transfer. For example, a standard aluminum automotive radiator 150 can be utilized to reject heat from the standard cooling water loop 134 to the ambient air. Aluminum is cheaper and lighter than stainless, and provides a much higher heat transfer rate to air than does stainless. Also, aluminum automotive radiators are commercially available, thus eliminating the requirement for expensive custom manufacture. Thus, the cooling system of the present invention enables the use of a smaller, lighter and less expensive radiator, requiring a smaller surface area and, therefore, less aerodynamic drag, than would be possible with stainless-to-air heat transfer. The provision of two separate cooling water loops 132, 134 also minimizes the quantity of deionized water necessary for fuel cell cooling and thereby reduces the potential for freezing. In addition, in preferred form, the present invention takes further advantage of the separate cooling water loops by consolidating the anode reservoir 92 and other deionized water handling piping and equipment in a thermally insulated and/or heated location to further minimize the likelihood of freezing.

In a preferred form, the deionized water pump 144 and the standard cooling water pump 138 comprise a double-ended pump driven by a single motor. A thermostat is preferably provided in the deionized water loop 132 or in the fuel cell cooling water jacket to maintain the desired stack exit temperature as required for anode humidity retention, as described above. The radiator 150 can further comprise a fan to assist in rejecting heat to the ambient air. A standard automotive cabin fan coil unit can also be provided for heating the cabin of a fuel cell powered vehicle.

During start-up, deionized cooling water discharged from the fuel cell 12 can be diverted through start-up conduit 146 and pumped, by means of the start-up pump 90 through the start-up eductor 88 to provide motive flow for the anode recirculation during start-up.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A system for controlling the reactant and coolant streams to and from a fuel cell, the fuel cell of the variety having a first reactant inlet, a first reactant outlet, a second reactant inlet, a second reactant outlet, a coolant inlet, and a coolant outlet, said system comprising:

(a) a first reactant humidification subsystem for supplying a first reactant inlet stream to the first reactant inlet of the fuel cell and receiving a first reactant exhaust stream from the first reactant outlet of the fuel cell, said first reactant humidification subsystem comprising an enthalpy wheel for collecting moisture from the first reactant exhaust stream and transferring a portion of the collected moisture to the first reactant inlet stream;

(b) a second reactant humidity retention subsystem comprising a recirculation loop for collecting excess second reactant from the second reactant outlet of the fuel cell, a source of second reactant, mixing means for mixing second reactant from said source with second reactant collected from the second reactant outlet of the fuel cell, and motive means for circulating second reactant in said recirculation loop and for introducing second reactant into the second reactant inlet of the fuel cell; and (c) a coolant subsystem comprising a first coolant loop communicating with said coolant inlet and said coolant outlet, a second coolant loop, and a heat exchanger for transferring heat between said first and second coolant loops, said first coolant loop being segregated from said second coolant loop.

2. The system of claim 1 wherein said enthalpy wheel is designed to rotate at a speed of rotation through an exhaust zone in the first reactant exhaust stream wherein heat and moisture from the first reactant exhaust stream are adsorbed by said enthalpy wheel, and through a supply zone in the first reactant inlet stream wherein heat and moisture are rejected from said enthalpy wheel to the first reactant inlet stream.

3. The system of claim 1, wherein said first reactant humidification subsystem further comprises first monitoring means for monitoring the relative humidity of the first reactant inlet stream supplied to the first reactant inlet of the fuel cell, and first control means for controlling the speed of rotation of said enthalpy wheel in response to the monitored relative humidity of the first reactant inlet stream.

4. The system of claim 3, wherein said first reactant humidification subsystem further comprises quench means for adjusting the dry bulb temperature of the first reactant inlet stream.

5. The system of claim 4, wherein said quench means comprises an ultrasonic nozzle for introducing a quench liquid into the first reactant inlet stream at a quench supply rate, whereby evaporation of said quench liquid cools the first reactant inlet stream.

6. The system of claim 5, wherein said first reactant humidification subsystem further comprises second monitoring means for monitoring the dry bulb temperature of the first reactant inlet stream supplied to the first reactant inlet of the fuel cell, and second control means for controlling the quench supply rate in response to the monitored dry bulb temperature of the first reactant inlet stream.

7. The system of claim 1, wherein said enthalpy wheel comprises an acrylic base and a ceramic zeolite.

8. The system of claim 1, wherein said first reactant humidification subsystem further comprises filtering means for selectively filtering at least one component from said first reactant inlet stream.

9. The system of claim 8, wherein said filtering means comprises a molecular sieve for filtering nitrogen from said first reactant inlet stream.

10. The system of claim 1, wherein said mixing means of said second reactant humidity retention subsystem further comprises means for controlling the stoichiometric quantity of second reactant supplied to the fuel cell.

11. The system of claim 10, wherein said motive means and said mixing means comprise a first eductor for receiving a high-velocity stream of second reactant from said source and mixing said high-velocity stream of second reactant with the excess second reactant collected from the second reactant outlet of the fuel cell, and thereby circulating the second reactant.

12. The system of claim 11, wherein said motive means further comprises a second eductor for receiving a high velocity stream of driving fluid for circulating the second reactant during startup of the fuel cell.

13. The system of claim 10, wherein the stoichiometric quantity of second reactant supplied to the fuel cell is controlled at approximately two times the amount of second reactant required by the fuel cell.

14. The system of claim 10, wherein the stoichiometric quantity of second reactant supplied to the fuel cell is controlled to a rate whereby the total enthalpy of the excess second reactant collected from the second reactant outlet of the fuel cell is approximately equal to the total enthalpy of the second reactant introduced into the second reactant inlet of the fuel cell.

15. The system of claim 1, wherein said first coolant loop comprises deionized water and said second coolant loop comprises coolant, and wherein said second coolant loop further comprises a radiator for rejecting heat from said second coolant loop to the ambient.

16. The system of claim 1, wherein the fuel cell is a proton exchange membrane fuel cell, and wherein the first reactant comprises air supplied to the fuel cell's cathode as an oxidant, and wherein the second reactant comprises hydrogen supplied to the fuel cell's anode as a fuel.

17. A method for controlling the reactant and coolant streams to and from a fuel cell, the fuel cell having a first reactant inlet, a first reactant outlet, a second reactant inlet, a second reactant outlet, a coolant inlet and a coolant outlet, said method comprising:

(a) providing a first reactant supply stream for introduction to the first reactant inlet;

(b) receiving a first reactant exhaust stream from the first reactant outlet;

(c) collecting moisture from the first reactant exhaust stream;

(d) transferring at least a portion of the collected moisture to the first reactant supply stream using an enthalpy wheel;

(e) collecting an excess of second reactant from the second reactant outlet;

(f) mixing the collected excess of second reactant with a supply of second reactant from an external source to form a mixture of second reactant;

(g) circulating the mixture of second reactant under motive force for introduction into the second reactant inlet;

(h) circulating coolant through a first coolant loop in communication with the coolant inlet and the coolant outlet;

(i) transferring heat from the first coolant loop to a second segregated coolant loop; and (j) rejecting heat from the second coolant loop to the ambient.

18. A system for conditioning a stream of reactant supplied to a fuel cell, said system comprising:

(a) exhaust collection means for collecting an exhaust stream of the reactant from the fuel cell;

(b) supply means for supplying an inlet stream of the reactant to the fuel cell; and (c) an enthalpy wheel for collecting sensible and latent heat from the exhaust stream and transferring the sensible and latent heat to the inlet stream.

19. The system of claim 18, wherein said enthalpy wheel is designed to rotate at a speed of rotation through an exhaust zone adjacent the exhaust collection means and a supply zone adjacent the supply means.

20. The system of claim 18, wherein the fuel cell is a proton exchange membrane fuel cell, and wherein the reactant comprises air supplied to the fuel cell's cathode as an oxidant.

21. A method of conditioning air supplied as an oxidant to a fuel cell's cathode, the cathode comprising a cathode inlet and a cathode exhaust, said method comprising the steps:

(a) collecting moisture from the cathode exhaust in an enthalpy wheel; and (b) transferring at least a portion of the collected moisture from the enthalpy wheel to the cathode inlet.

22. A system for conditioning a stream of reactant supplied to a fuel cell, the fuel cell having a reactant inlet stream and a reactant exhaust stream, said system comprising;

(a) a recirculation loop for collecting excess reactant from the fuel cell;

(b) mixing means for mixing the collected excess reactant with a supply of reactant from an external source to form a reactant mixture;

(c) motive means for circulating reactant through said recirculation loop and introducing the reactant mixture into the fuel cell; and (d) control means for controlling the total enthalpy of reactant in the reactant exhaust stream to be approximately equal to the total enthalpy of the reactant introduced into the fuel cell.

23. A method of retaining moisture in a flow of hydrogen to an anode of a fuel cell, said method comprising:

(a) collecting excess hydrogen discharged from the fuel cell;

(b) mixing a first quantity of fresh hydrogen from an external source with a second quantity of the excess hydrogen collected from the fuel cell to form a mixture of hydrogen;

(c) controlling the first and second quantities of hydrogen to control the total enthalpy of the mixture to be approximately equal to the total enthalpy of the hydrogen exhausted from the fuel cell; and (d) introducing the mixture into the fuel cell.

24. A coolant system for cooling a fuel cell, said coolant system comprising:

(a) a first closed coolant loop communicating with said fuel cell employing a first coolant;

(b) a second closed coolant loop employing a second coolant isolated from said first closed coolant loop;

(c) a heat exchanger for transferring heat between said first coolant loop and said second coolant loop and said fuel cell; and (d) a radiator for rejecting heat from said second coolant loop.

25. A system for conditioning a stream of reactant supplied to a fuel cell, said system comprising:

(a) exhaust collection means for collecting an exhaust stream of the reactant from the fuel cell;

(b) supply means for supplying an inlet stream of the reactant to the fuel cell;

(c) enthalpy transfer means for collecting sensible and latent heat from the exhaust stream, the latent heat being in the form of water vapor collected from the exhaust stream without condensing the water vapor, and transferring the sensible and latent heat to the inlet stream, the latent heat being transferred to the inlet stream by transferring the water collected form the exhaust stream to the inlet stream.

* * * * *